United States Patent
Huang

(10) Patent No.: US 8,339,087 B2
(45) Date of Patent: Dec. 25, 2012

(54) FAN CONTROL CIRCUIT

(75) Inventor: Yong-Zhao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 604 days.

(21) Appl. No.: 12/644,017

(22) Filed: Dec. 22, 2009

(65) Prior Publication Data

US 2011/0095092 A1    Apr. 28, 2011

(30) Foreign Application Priority Data

Oct. 28, 2009   (CN) .......................... 2009 1 0308960

(51) Int. Cl.
*H02P 4/00*  (2006.01)
*H02K 9/06*  (2006.01)
*G05D 23/24*  (2006.01)

(52) U.S. Cl. ...................................... 318/471; 318/504

(58) Field of Classification Search .................. 318/471, 318/472, 473, 478, 479, 504; 388/934
See application file for complete search history.

(56) References Cited

U.S. PATENT DOCUMENTS

| | | | | | |
|---|---|---|---|---|---|
| 2,991,405 | A | * | 7/1961 | Carlson | 318/471 |
| 3,324,372 | A | * | 6/1967 | Myers | 318/806 |
| 4,806,832 | A | * | 2/1989 | Muller | 388/833 |
| 5,831,405 | A | * | 11/1998 | Massie | 318/471 |
| 7,990,092 | B2 | * | 8/2011 | Woodward | 318/432 |
| 2008/0191669 | A1 | * | 8/2008 | Azimi et al. | 323/234 |

* cited by examiner

*Primary Examiner* — Bentsu Ro
(74) *Attorney, Agent, or Firm* — Altis Law Group, Inc.

(57) ABSTRACT

A fan control circuit includes an integrated circuit (IC), a thermistor, and a transistor. A first input of the IC is connected to a fan power supply. A second input of the IC is connected to a stand-by power supply. A base of the transistor is grounded through the thermistor. An emitter of the transistor is connected to an output of the IC. A collector of the transistor is connected to a fan.

5 Claims, 1 Drawing Sheet

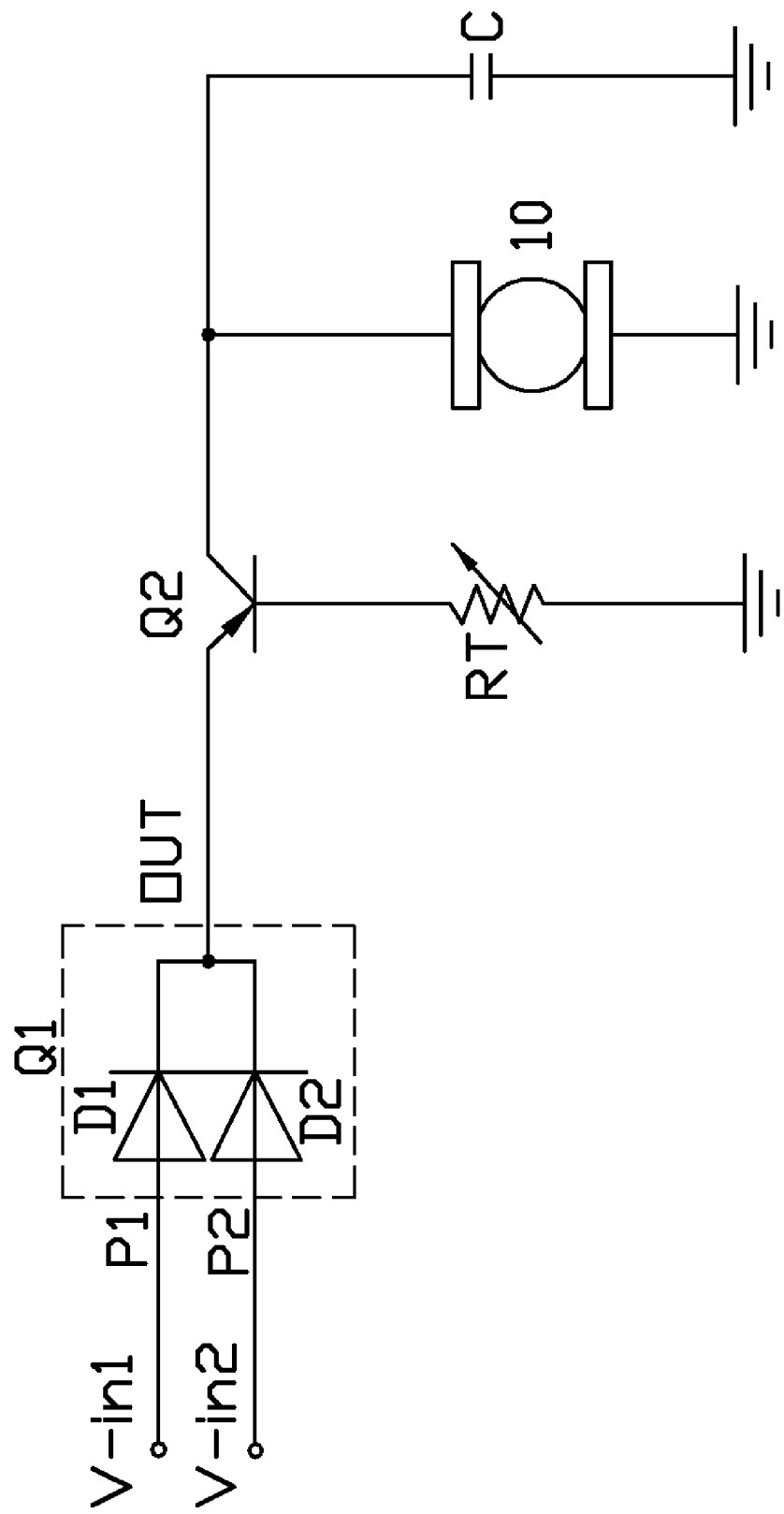

FAN CONTROL CIRCUIT

BACKGROUND

1. Technical Field

The present disclosure relates to a fan control circuit.

2. Description of Related Art

A conventional cooling fan for an electronic device, a computer for instance, stops rotating when the electronic device is powered off. The remaining heat dissipates slowly when the cooling fan is shut down. Therefore, the temperature of the electronic device cannot decrease quickly when the surrounding temperature is high.

BRIEF DESCRIPTION OF THE DRAWING

The drawing is a circuit diagram of an exemplary embodiment of a fan control circuit.

DETAILED DESCRIPTION

Referring to the drawing, an exemplary embodiment of a fan control circuit includes an integrated circuit (IC) Q1, a p-n-p transistor Q2, a thermistor RT, and a capacitor C.

The IC Q1 is a BAT54C IC including a first Schottky barrier diode D1 and a second Schottky barrier diode D2. An anode of the first Schottky barrier diode functions as a first input P1 of the IC Q1, to connect to a fan power supply V-in1. An anode of the second Schottky barrier diode functions as a second input P2 of the IC Q1, to connect to a stand-by power supply V-in2. A cathode of the first Schottky barrier diode is connected to a cathode of the second Schottky barrier diode and functions as an output OUT of the IC Q1.

The thermistor RT is a negative temperature coefficient thermistor.

A base of the p-n-p transistor Q2 is grounded through the thermistor RT. An emitter of the p-n-p transistor Q2 is connected to the output OUT of the IC Q1. A collector of the p-n-p transistor Q2 is connected to a first end of a fan 10 of a computer and grounded through the capacitor C. A second end of the fan 10 is grounded. The capacitor C is for stabilizing the voltage of the fan 10.

The voltage of the fan power supply V-in1 is +12 volts (V) and the voltage of the stand-by power supply V-in2 is +5V when the computer is powered on. The voltage of the first input P1 of the IC Q1 is greater than the voltage of the second input P2 of the IC Q1. The output OUT of the IC Q1 outputs the voltage of the fan power supply V-in1. The p-n-p transistor Q2 is turned on. The resistance of the thermistor RT decreases as the ambient temperature increases. The current through the p-n-p transistor Q2 increases to increase the rotation rate of the fan 10. The resistance of the thermistor RT increases as the ambient temperature decreases. The current through the p-n-p transistor Q2 decreases to reduce the rotation rate of the fan 10.

The voltage of the fan power supply V-in1 is 0V and the voltage of the stand-by power supply V-in2 is +5V when the computer is powered off. The voltage of the second input P2 of the IC Q1 is greater than the voltage of the first input P1 of the IC Q1. The output OUT of the IC Q1 outputs the voltage of the stand-by power supply V-in2. The p-n-p transistor Q2 is turned on to drive the fan 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A fan control circuit, comprising:
   an integrated circuit (IC) comprising a first input connected to a fan power supply, a second input connected to a stand-by power supply, and an output;
   a thermistor;
   a transistor, wherein a base of the transistor is grounded through the thermistor, an emitter of the transistor is connected to the output of the IC, and a collector of the transistor is connected to a fan.

2. The fan control circuit of claim 1, wherein the transistor is a p-n-p transistor.

3. The fan control circuit of claim 1, wherein the collector of the transistor is grounded through a capacitor.

4. The fan control circuit of claim 1, wherein the thermistor is a negative temperature coefficient thermistor.

5. The fan control circuit of claim 1, wherein the IC comprises a first Schottky barrier diode and a second Schottky barrier diode, an anode of the first Schottky barrier diode functions as the first input of the IC, an anode of the second Schottky barrier diode functions as the second input of the IC, a cathode of the first Schottky barrier diode is connected to a cathode of the second Schottky barrier diode and functions as the output of the IC.

* * * * *